(12) United States Patent
Liu et al.

(10) Patent No.: US 11,751,102 B2
(45) Date of Patent: Sep. 5, 2023

(54) RESOURCE RESERVATION FOR SIDELINK COMMUNICATION

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/303,011

(22) Filed: May 18, 2021

(65) Prior Publication Data

US 2022/0377618 A1     Nov. 24, 2022

(51) Int. Cl.
*H04W 28/26*     (2009.01)
*H04W 74/04*     (2009.01)
*H04W 72/04*     (2023.01)
*H04W 72/0453*   (2023.01)
*H04W 74/08*     (2009.01)

(52) U.S. Cl.
CPC ....... *H04W 28/26* (2013.01); *H04W 72/0453* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 2021/0022157 A1* | 1/2021 | Sun | H04W 72/1257 |
| 2021/0022182 A1* | 1/2021 | Mondal | H04W 88/06 |
| 2021/0092783 A1  | 3/2021 | Sun et al. | |
| 2021/0136732 A1  | 5/2021 | Fakoorian et al. | |
| 2021/0307070 A1* | 9/2021 | Kim | H04W 74/0808 |
| 2022/0104260 A1* | 3/2022 | Wang | H04W 72/14 |

OTHER PUBLICATIONS

International Search Report and Written Opinion—PCT/US2022/025444—ISA/EPO—dated Jul. 7, 2022.

* cited by examiner

*Primary Examiner* — Saba Tsegaye

(74) *Attorney, Agent, or Firm* — Haynes and Boone, LLP

(57) ABSTRACT

Wireless communications systems and methods related to resource reservation for sidelink communication over a shared radio frequency band are provided. The method of wireless communication performed by a user equipment (UE) includes performing, in a shared radio frequency band, a listen-before-talk (LBT) for a first channel occupancy time (COT) and transmitting, during the first COT, a COT structure indicator, wherein the COT structure indicator reserves at least one resource within a second COT different than the first COT.

30 Claims, 13 Drawing Sheets

RESOURCE RESERVATION FOR SIDELINK COMMUNICATION

TECHNICAL FIELD

This application relates to wireless communication systems, and more particularly to resource reservation for sidelink communication over a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later For example, in an aspect of the disclosure, a method of wireless communication performed by a user equipment (UE) includes performing, in a shared radio frequency band, a listen-before-talk (LBT) for a first channel occupancy time (COT) and transmitting, during the first COT, a COT structure indicator, wherein the COT structure indicator reserves at least one resource within a second COT different than the first COT.

In an additional aspect of the disclosure, a method of wireless communication performed by a user equipment (UE) includes receiving, within a first channel occupancy time (COT) in a shared radio frequency band, a COT structure indicator, wherein the COT structure indicator reserves at least one resource within a second COT different than the first COT and refraining, based on the COT structure indicator reserving the at least one resource within the second COT, from contending for the second COT.

In an additional aspect of the disclosure, a user equipment (UE) includes a memory, a transceiver, and at least one processor coupled to the memory and the transceiver, wherein the at least one processor is configured to perform, in a shared radio frequency band, a listen-before-talk (LBT) for a first channel occupancy time (COT) and transmit, during the first COT, a COT structure indicator, wherein the COT structure indicator reserves at least one resource within a second COT different than the first COT.

In an additional aspect of the disclosure, a user equipment (UE) includes a memory, a transceiver, and at least one processor coupled to the memory and the transceiver, wherein the at least one processor is configured to receive, within a first channel occupancy time (COT) in a shared radio frequency band, a COT structure indicator, wherein the COT structure indicator reserves at least one resource within a second COT different than the first COT and refrain, based on the COT structure indicator reserving the at least one resource within the second COT, from contending for the second COT.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
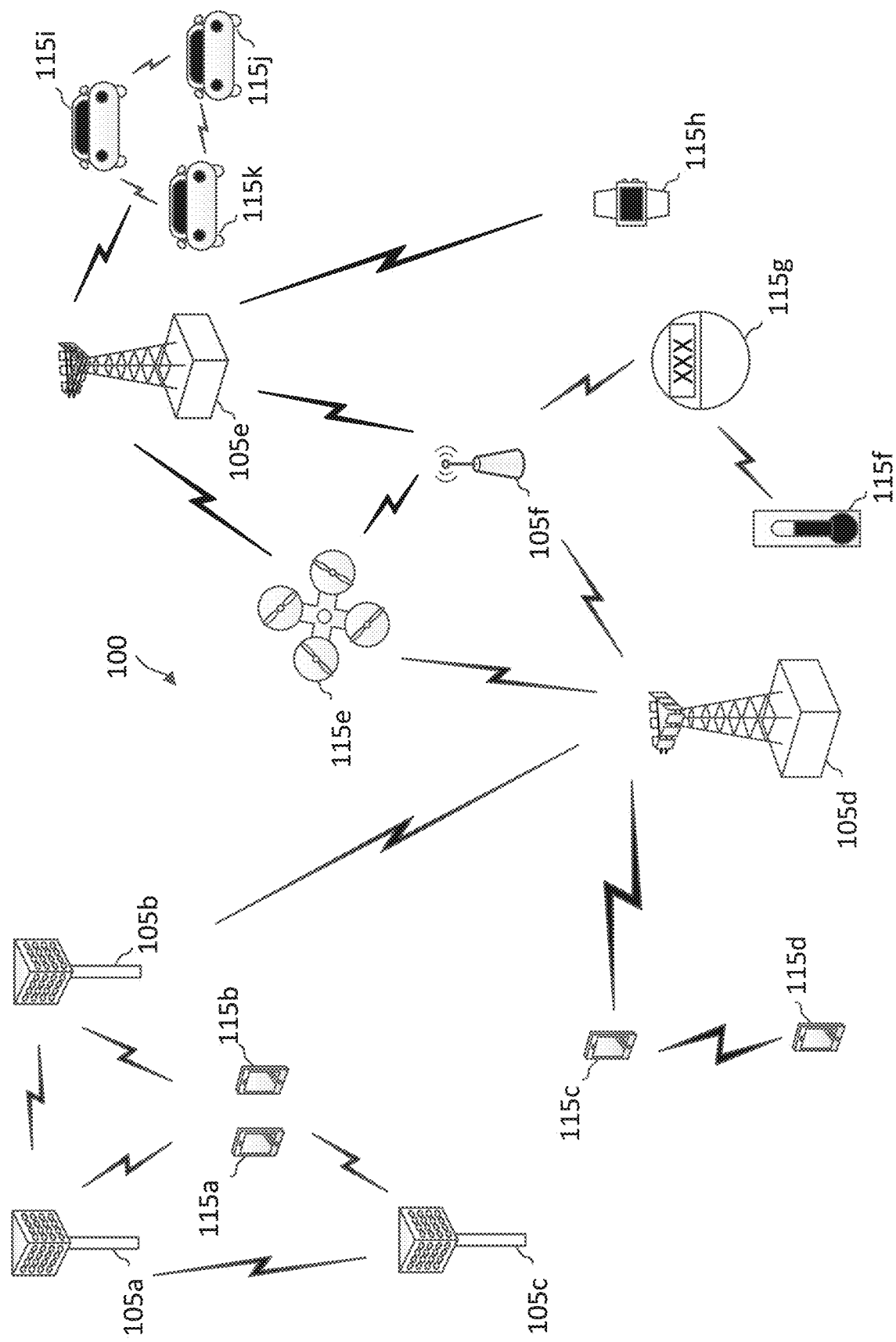
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and as a receiving sidelink UE at another time.

In some instances, a base station may configure a set of resources for use in sidelink communications between UEs. For example, the base station may configure frame and slot timing, which may be used for UEs in sidelink communications. In some cases, the configured resources for sidelink UEs may include shared or unlicensed radio frequency spectrum in which devices that are to access a channel perform a contention-based channel access procedure that provides fair channel access to the unlicensed or shared radio frequency spectrum. For example, a UE may perform a listen before talk (LBT) procedure (e.g., a clear channel assessment (CCA)) and determine whether signals from another device are detected on a channel or sub-channel. In the event that other signals indicative of another device using the channel are not detected, the UE may determine that the channel is available and transmit a reservation signal to indicate to other UEs that the channel is reserved for a channel occupancy time (COT).

As discussed herein, in some cases a UE may transmit one or more repetitions of a communication in order to enhance the likelihood of successful reception of the communication. Such techniques may be used, for example, in cases where a communication has a high priority, where the communication has a low latency target and/or a high reliability, where channel conditions are relatively unfavorable, or any combinations thereof. In wireless communication networks that use licensed radio frequency spectrum, the availability of a channel to transmit one or more of such repetitions may be known based on scheduling of resources for UE communications. Thus, in such cases, a UE may identify a set of resources for a communication and one or more sets of resources for repetitions (e.g., reservations for future resources) of the communication. The communication and associated resources may then be transmitted using the identified resources. However, in cases where unlicensed or shared radio frequency spectrum is used for such communications, the availability of the channel may be dependent upon a successfully completed contention-based channel access procedure (e.g., a LBT or CCA procedure).

In accordance with various aspects described herein, resource reservation for one or more repetitions of a communications may be identified relative to a COT and determined based on a COT timing. In some cases, a first UE may transmit a first communication to a second UE during a first COT and may reserve resources of one or more subsequent COTs for one or more repetitions of the first communication. The first UE may transmit an indication of a reservation for reserved resources. In some cases, the reserved resources may be identified based at least in part on a two stage resource reservation, in which reserved resources are identified relative to a timing of the transmission of the reservation indication or the end of the first COT. Such a UE may first determine a timing of a second COT and may then determine a timing of the reserved resources based on the timing of the second COT. In some cases, the reserved resources may be identified based at least in part on one or more offsets from a starting time of the second COT. The first UE may transmit one or more additional instances of the first communication using the reserved resources.

In some aspects, an indication of the reserved resources may be provided with sidelink control information (SCI) that is transmitted by the first UE. In some cases, one or more of the reserved resources may be within shared COTs that are obtained (contended and won) by a different UE than the first UE. The UEs receiving the SCI indicating the reserved resources may respect the reservations by refraining from transmitting during a period (e.g., 0.5 ms to 2 ms, 1 symbol, or 2 symbols for example) immediately before each reserved resource and during each reserved resource within the one or more subsequent COTs. However, if the reserved resources are unused by the reserving UE, the other UEs may contend for the reserved resources. In some aspects, the SCI may include a traffic priority associated with the traffic to be transmitted by the reserving UE in the reserved resources. In order to prioritize certain classes of traffic, the other UEs may transmit within the reserved resources when the other UEs have higher priority traffic to be transmitted. Each of the reserved frequency resources may be separated by a guard band. In some instances, when multiple contiguous resource block sets are reserved, the UE may transmit in the guard bands between the contiguous resource block sets. For example, when contiguous resource block sets are reserved the guard band separating the resource block sets may be used for PSSCH transmission. However, the guard band between a reserved block and an unreserved block may not be used for PSSCH transmission. In order to increase the efficient use of frequency resources, the size of the overlapping channels in the guard bands may be reduced. By reducing the size of the overlapping channels, the number of unused frequency resources may be reduced. For example, since the guard bands are specified by the number of RBs in the subchannel, choosing a granularity for the size of the resource blocks may increase the efficient usage of available frequency resources. For example, reducing the subchannel size (e.g., reducing the subchannel size to 10 RBs) may reduce the amount of unused frequency resources in overlapping subchannels that overlap LBT guard bands.

Various aspects of the subject matter described herein may be implemented to realize one or more of the following potential advantages. The techniques employed by the described base stations and UEs may provide benefits and enhancements to the operation of a wireless communications system. For example, operations performed by the UEs may provide improvements to reliability and efficiency in communications using shared radio frequency spectrum with sidelink UEs and other devices that may contend for channel access to the shared radio frequency spectrum. Such improvements may enhance efficiency of wireless communications at a UE by allowing for reliable transmission and retransmission of communications, which may enhance the likelihood of successful receipt of the communications at a receiving device. By reserving future resources for retransmission of unsuccessful transmissions, the probability of a successful transmission is increased. Additionally, the indication of reservation(s) for resource(s) in future COTs can silent other UEs during time periods before the reserved resource(s) and during the reserved resource(s). Accordingly, the indication of reservation(s) can increase the likelihood of the reserving UE in winning a contention for accessing the reserved resource(s). As another example, the present disclosure may provide the benefit of increasing the utilization of resources. For example, frequency guard bands between adjacent frequency resources may be used for data transmission, thereby increasing the utilization of the frequency resources. As another example, sharing of reserved resources that are not used by the reserving UE with other UEs may increase the utilization of resources. Aspects of the present disclosure can also provide the benefit of prioritizing the data traffic between UEs for real-time control applications. The described techniques may thus include features for improvements to reliability in communications, and enhanced communications efficiency for sidelink UEs and other devices that use shared radio frequency spectrum through reduced channel contention procedures associated with retransmissions, among other benefits.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless communication network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing wireless communication network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel A wireless communication device may perform an LBT in the shared channel LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel Conversely, the LBT results in a failure when a channel reservation signal is detected in the channel A TXOP may also be referred to as channel occupancy time (COT).

Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
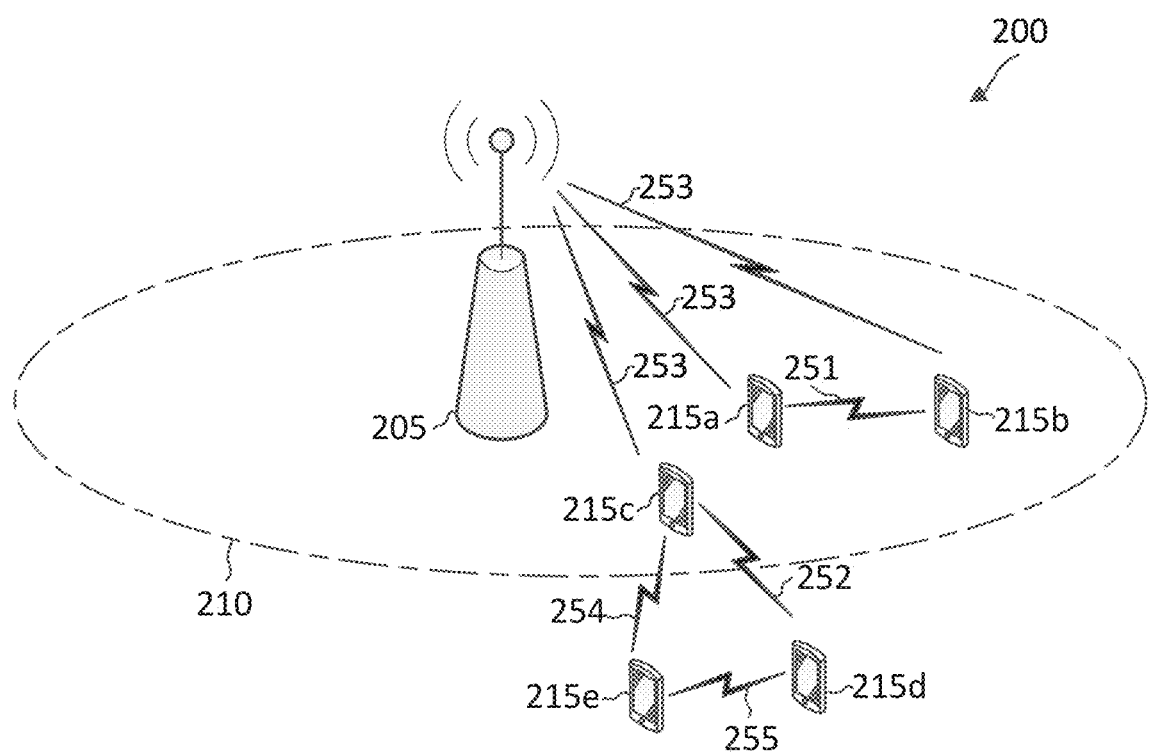
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. Sidelink communication can also be communicated over a physical sidelink feedback control channel (PSFCH), which indicates an acknowledgement (ACK)-negative acknowledgement (NACK) for a previously transmitted PSSCH.

FIG. 2 illustrates an example of a wireless communication network 200 that provisions for sidelink communications according to aspects of the present disclosure. The network 200 may correspond to a portion of the network 100. FIG. 2 illustrates one BS 205 and five UEs 215 (shown as 215*a*, 215*v*, 215*c*, 215*d*, and 215*e*) for purposes of simplicity of discussion, though it will be recognized that aspects of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a licensed band. In some instances, the radio frequency band may be an unlicensed band (e.g., in a 5 GHz band). In some instances, the radio frequency band may be a frequency range 1 (FR1) band. In some instances, the radio frequency band may be a FR2 band. In general, the radio frequency band may be at any suitable frequency and may have any suitable bandwidth (e.g., about 5 MHz, about 10 MHz, about 20 MHz, about 80 MHz, about 100 MHz or more).

In the network 200, some of the UEs 215 may communicate with each other in peer-to-peer communications. For example, the UE 215a may communicate with the UE 215b over a sidelink 251, the UE 215c may communicate with the UE 215d over a sidelink 252 and/or with the UE 215e over a sidelink 254, and the UE 215d may communicate with the UE 215e over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d and UE 215e are outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

Figure 3:
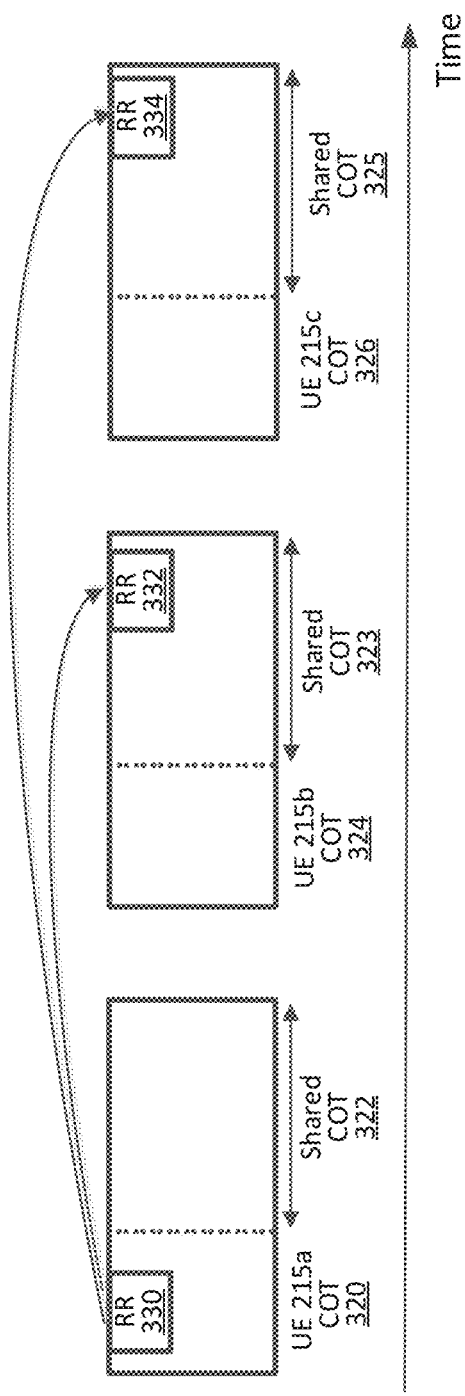
FIG. 3 illustrates reserved resources for sidelink communications according to some aspects of the present disclosure.

FIG. 3 illustrates reserved resources (e.g., time and frequency resources) for sidelink communications according to some aspects of the present disclosure. In some instances, the methods of reserving resources in COTs may implement aspects of wireless communication network 100 or 200 as described above. In one example, a first UE may reserve resources in future COTs for sidelink communications with a peer UE.

For example, a first UE 215a (e.g., a UE 115 UE 215 of FIG. 1 or 2) may perform a LBT to obtain a UE COT 320 in a shared channel for communications, for example, with a peer sidelink UE. The LBT may be a CAT4 LBT. The LBT may be a pass indicating that the shared channel is clear for transmission. The first UE 215a may share a portion (shown as a first shared COT 322) with other UEs. That is, the first shared COT 322 may be used by other UEs for transmissions. Upon successfully obtaining first UE COT 320, the first UE 215a may provide a COT indication that identifies the first UE COT 320 and the first shared COT 322. The COT indication may include a start time, a duration, and/or an end time of the first UE COT 320, and/or a start time, a duration, and/or an end time of the first shared COT 322. Similarly, a second UE 215b may perform a LBT to obtain a second UE COT 324 in a shared channel for communications, for example, with a peer sidelink UE. The LBT may be a CAT4 LBT. The LBT may be a pass indicating that the shared channel is clear for transmission. The second UE 215b may share a portion (shown as a second shared COT 323) with other UEs. That is, the second shared COT 323 may be used by other UEs for transmissions. Upon successfully obtaining second UE COT 324, the second UE 215b may provide a COT indication that identifies the second UE COT 324 and the second shared COT 323. The COT indication may include a start time, a duration, and/or an end time of the second UE COT 324, and/or a start time, a duration, and/or an end time of the second shared COT 323. Similarly, a third UE 215c may perform a LBT to obtain a third UE COT 326 in a shared channel for communications, for example, with a peer sidelink UE. The LBT may be a CAT4 LBT. The LBT may be a pass indicating that the shared channel is clear for transmission. The third UE 215c may share a portion (shown as a third shared COT 325) with other UEs. That is, the third shared COT 325 may be used by other UEs for transmissions. Upon successfully obtaining the third UE COT 326, the third UE 215c may provide a COT indication that identifies the third UE COT 326 and the third shared COT 325. The COT indication may include a start time, a duration, and/or an end time of the third UE COT 326, and/or a start time, a duration, and/or an end time of the third shared COT 325.

In some instances, the first UE 215a may perform an LBT before the reserved resource 332 to obtain a COT so that the reserved resource 332 is within the first UE 215a's COT. Similarly, the first UE 215a may perform an LBT before the reserved resource 334 to obtain a COT so that the reserved resource 334 is within the first UE 215a's COT, and so on. Accordingly, the reserved resource 332 and the reserved resource 334 are within future COTs of the first UE 215a. In other instances, the reserved resources 332 and 334 can fall within another UE's COT. For instance, another UE 215b may perform an LBT to obtain the COT 324, and the reserved resource 332 can be within a shared portion (shown as 323 of the UE 215b's COT 324). For another example, another UE 215c may perform an LBT to obtain the COT 326, and the reserved resource 334 can be within a shared portion (shown as 325 of the UE 215c's COT 326).

Figure 4:
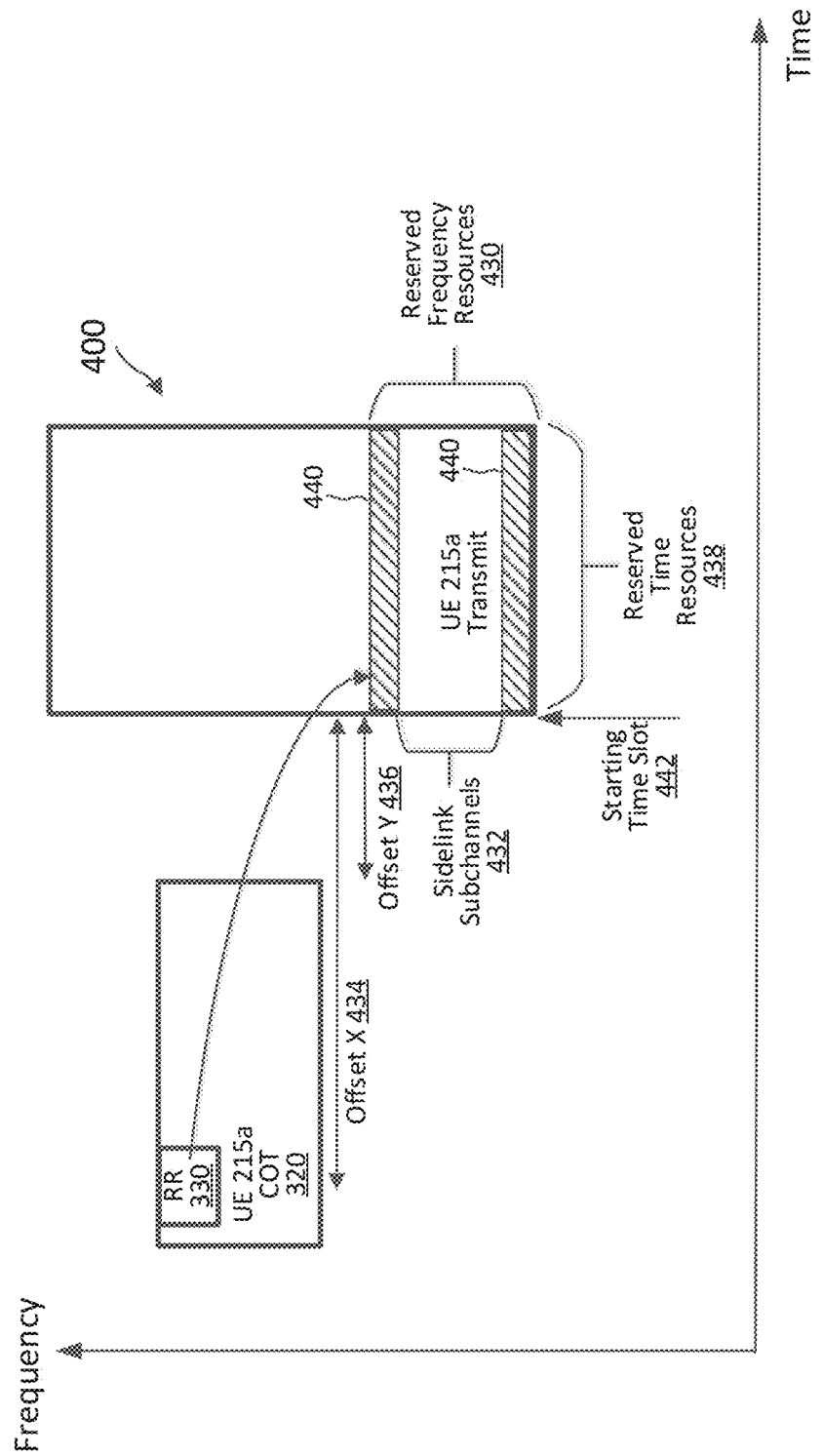
FIG. 4 illustrates reserved resources for sidelink communications according to some aspects of the present disclosure.

FIG. 4 illustrates reserved resources 400 for sidelink communications according to some aspects of the present disclosure. In FIG. 4, the x-axis may represent time in some arbitrary units, and the y-axis may represent frequency in some arbitrary units. The reserved resources 400 may be reserved for a UE (e.g., UEs 115, UEs 215) performing sidelink communications in a wireless communications network (e.g., wireless communication network 100 or 200). For example, the resources 400 may be reserved for UE 215a retransmissions of a first transmission (e.g. retransmissions of a failed first transmission), for example, in a reserved resource 330. In some instances, UE 215a may transmit one or more transport blocks within COT 320. The UE 215a may also reserve future resources (e.g. one or more symbols or one or more time slots in time and one or more frequency subcarriers or one frequency subchannels in frequency) for retransmissions. In some instances, the UE 215a may reserve the future resources within the same COT 320 save overhead associated with the LBT. In other instances, the UE 215a may reserve the future resources in future COTs (after the COT 320). In the illustrated example of FIG. 4, the UE 215a reserves a future resource 400. The UE 215a may transmit, in the COT 320, an indication of a reservation for the future resources 400. Other UEs within communication range of the UE 215a may respect the resource reservation and refrain from contending for the reserved resources 400. Additionally, the other UEs may not transmit during a time period (e.g., about 1 symbol time) immediately before the reserved resources 400 so that the UE 215a may perform an LBT during that time period and gain access to the channel for transmission in the reserved resource 400. The time period to be used for LBT by the UE 215a may be referred to as a gap time period. The other UEs that receive the resource reservations may refrain from transmitting within the reserved resources and the gap time period. However, the other UEs may contend for resources outside of the reserved resources and the gap time period. In some instances, another UE may successfully obtain a COT before the gap time period, and may share a portion of the COT as discussed above with reference to FIG. 3. In some instances, the reserved resource 400 may be within the shared COT of the other's UE. In such instances, the UE 215a may perform a CAT2 LBT (instead of a CAT4 LBT) before transmitting in the reserved resources 400.

The UE 215a may reserve future reserved resources 400 by transmitting the resource reservation in a COT SI, for example, within SCI-1 and/or SCI-2. The COT SI may be transmitted within a COT that was obtained by performing an LBT (e.g., CAT4 LBT) to gain access to the COT 320. In some instances, the COT SI may be transmitted from a reserved resource 330. The resource reservation may include information related to the reserved resources 400. For example, the resource reservation may include information elements indicating the number of time slots (e.g., contiguous time slots) reserved within reserved time resources 438. The resource reservation may also include the number of frequency subchannels reserved in the reserved frequency resources 430. In some instances, the reserved frequency resources 430 may include sidelink subchannels 432 in which the UE 215a may transmit and frequency guard bands 440 on either side (e.g., an upper frequency edge and a lower frequency edge) of the sidelink subchannels in which the UE 215a may refrain from transmitting. For instance, in some aspects, a frequency band may be partitioned into multiple subchannels similar to the sidelink subchannels 432 with guard bands similar to the guard bands 440 between subchannels. The guard bands are inserted between subchannels to mitigate interference from neighboring subchannels. Thus, the guard bands are not to be used for transmissions, for example, when adjacent subchannels are used for transmission by different UEs. However, in some instances, the UE 215a may transmit in the guard bands as discussed with reference to FIGS. 5-6, for example, when adjacent subchannels are used for transmission by the same UEs.

In some instances, the resource reservation carried in the COT SI may include information related to the starting time slot 442 of the reserved resources 400. For example, the resource reservation in the COT SI may indicate a timing offset Y 436 that indicates the timing of the starting time slot 442 based on an amount of time from the end of the COT 320 in which the resource reservation carried in the COT SI was transmitted. Stated differently, the COT SI may indicate a starting time of the resource 400 with respect to the end of the COT 320 in which the resource reservation carried in the COT SI was transmitted. In some instances, the UE 215a may transmit multiple COT-SIs within the current COT 320, for example, to indicate the end of the current COT 320.

As another example, the resource reservation in the COT SI may indicate a timing offset X 434 that indicates the timing of the starting time slot 442 based on an amount of time from the transmission of the COT SI. Stated differently, the COT SI may indicate a starting time of the resource 400 with respect to a transmission time of the COT SI that reserves the resource 400. For example, offset X 434 may be the amount of time from the beginning of the time slot in which the COT SI was transmitted. As another example, offset X 434 may be the amount of time from the end of the time slot in which the COT SI was transmitted.

Figure 5:
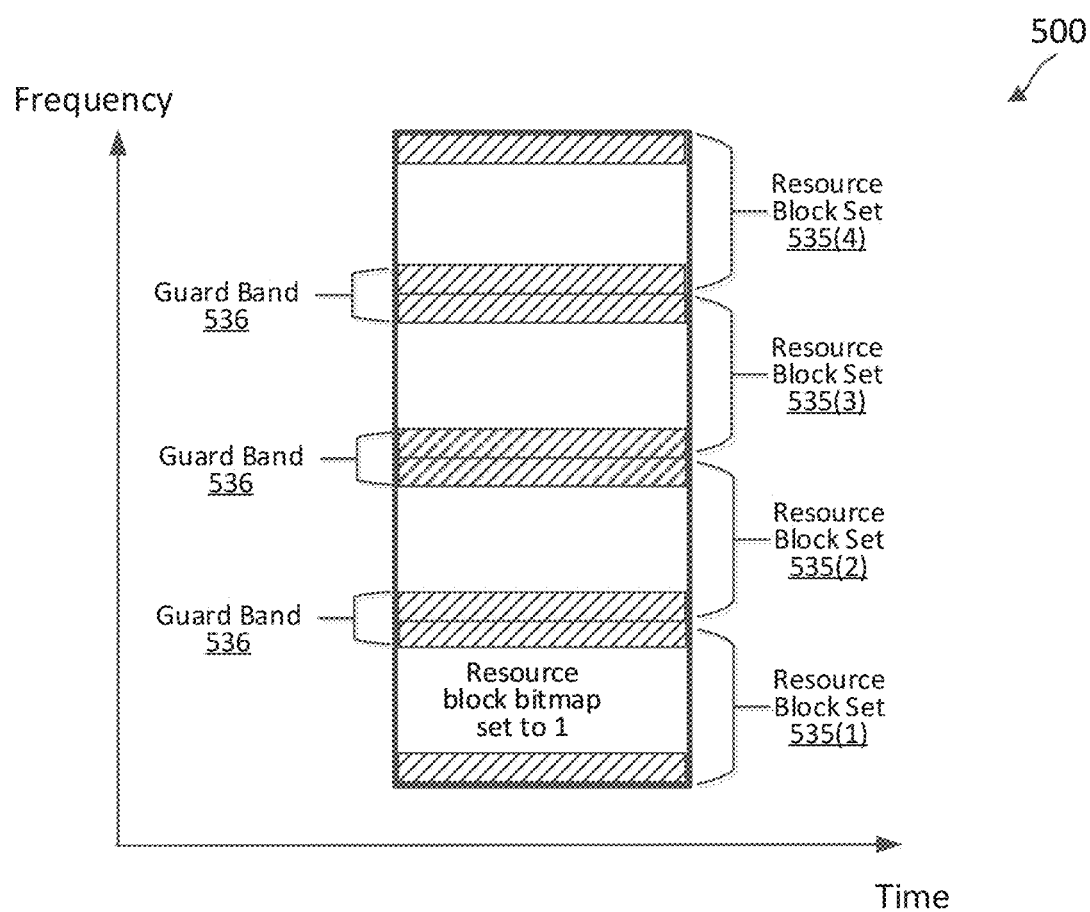
FIG. 5 illustrates guard bands between reserved frequency resources for sidelink communications according to some aspects of the present disclosure.

FIG. 5 illustrates guard bands 536 between reserved frequency resources 500 for sidelink communications according to some aspects of the present disclosure. In FIG. 5, the x-axis may represent time in some arbitrary units, and the y-axis may represent frequency in some arbitrary units. In some instances, the COT SI may indicate a starting subchannel and a number of contiguous subchannels to be reserved as frequency resources. In some instances, the reserving UE may operate in a wideband operating mode in which case the frequency resources reserved may be over multiple contiguous bands. For example, the reserved frequency resources may be over multiple contiguous 20 MHz bands. FIG. 5 shows multiple contiguous resource block sets indicated as resource block sets 535(1) . . . 535(4). Although FIG. 5 shows the example of 4 contiguous resource block sets 535(1) . . . 535(4), the present disclosure is not so limited and any number of contiguous resource block sets may be used. Further, each of the frequency bands of resource block sets 535(1) . . . 535(4) may be of any bandwidth (e.g., 5 MHz, 10 MHz, 20 MHz, 40 MHz, 80 MHz, etc.) The COT SI may indicate the reserved frequency resource block sets using any method. For example, the COT SI may use a bitmap method to indicate the resource block sets that are reserved for future retransmissions. Each bit in the bitmap may correspond to each resource block set 535(1) . . . 535(4).). That is, there is a one-to-one correspondence between the bits in the bitmap and the resource block set 535(1) . . . 535(4). As shown in FIG. 5, resource block set 535(1) may be reserved for future use by setting a bit to 1 in the corresponding bitmap position for resource block set 535(1). Additionally or alternatively, when resource block set 535(1) is reserved for future use by setting the corresponding bit to 1, the other unreserved resource block sets 535(2) . . . 535(4) may have a corresponding bit set to 0 in the bitmap. In some instances, the guard bands 536 between each resource block set 535(1) . . . 535(4) may be unavailable for reservation. In some instances, the guard bands 536 between each resource block set 535(1) . . . 535(4) may be available for reservation as will be described below with reference to FIG. 6. When a UE reserves resources over multiple subbands (e.g., 20 MHz LBT subbands), the reserving UE may indicate a set of subbands for reservation (e.g., subbands such as resource block sets 535(1) . . . 535(4)) that the UE expects to be clear (e.g., a successful LBT performed) during the reserved time.

In the example of FIG. 5, a time division mode may be used for resource block sets 535(1) . . . 535(4) in which a first UE which starts a transmission earlier than a second UE may block the LBT of the second UE. The first UE may perform a successful LBT and begin transmission which causes the second UE to fail the LBT when contending for the channel.

Additionally or alternatively, resource block sets 535(1) . . . 535(4) may be reserved as non-contiguous bands. For example, a UE may reserve resource block set 535(1) and resource block set 535(3). The bitmap that indicates the resource reservations may indicate the corresponding bits for resource block set 535(1) and resource block set 535(3) set to 1. The bitmap that indicates the resource reservations may also indicate the corresponding bits for resource block set 535(2) and resource block set 535(4) set to 0.

In some instances, a UE may be configured for concurrent transmission in which a UE transmits multiple transport blocks to different UEs at substantially the same time. For example, referring to FIG. 2, UE 215c may be configured to transmit a transport block over a PSSCH to UE 215d using the reserved resources of resource block set 535(1) and transmit a different transport block over a PSSCH to UE 215e using the resource block set 535(3). A UE configured for concurrent transmission may use contiguous and/or non-contiguous resource block sets to substantially simultaneously transmit to different UEs. However, if a UE is not configured for concurrent transmission, the UE may not transmit a single PSSCH in 2 non-contiguous subbands. The UE may perform an LBT in each reserved subband and transmit in a reserved subband that has been LBT cleared. In some instance, if the UE is not configured for concurrent PSSCH transmission, but is configured for wideband transmission, the UE may reserve more than one resource block set 535(1) . . . 535(4) (e.g., contiguous resource block set 535(1) and 535(2)) and may transmit in more than one resource block set 535(1) . . . 535(4) that have been cleared for transmission by LBT.

Figure 6:
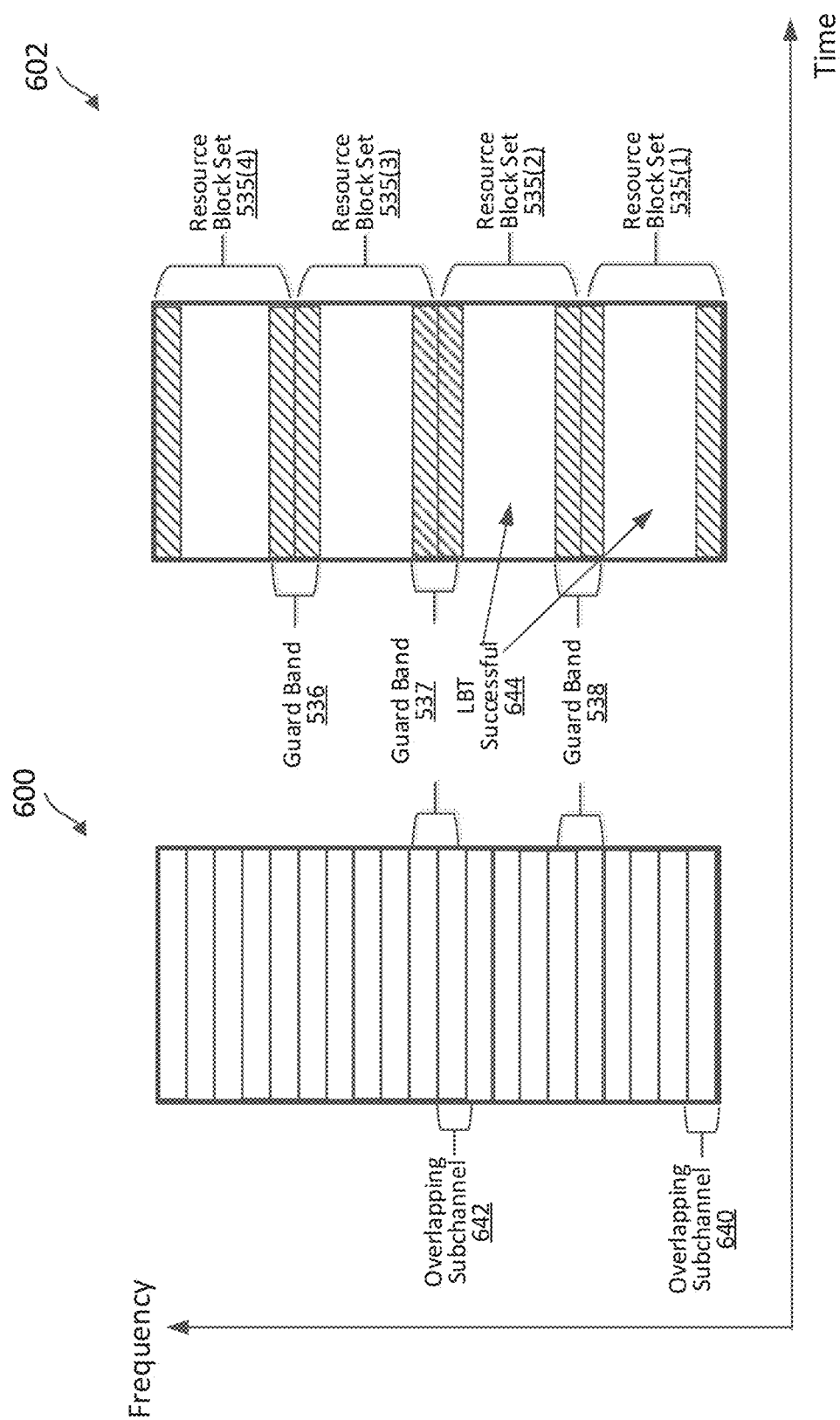
FIG. 6 illustrates overlapping subchannels between reserved frequency resources for sidelink communications according to some aspects of the present disclosure.

FIG. 6 illustrates overlapping subchannels 600 between reserved frequency resources 602 for sidelink communications according to some aspects of the present disclosure. In FIG. 6, the x-axis may represent time in some arbitrary units, and the y-axis may represent frequency in some arbitrary units. As shown by the reference numeral 602, each of the resource block sets 535(1) . . . 535(4) may be separated by a guard band. For example, resource block set 535(1) may be separated from resource block set 535(2) by guard band 538. Resource block set 535(2) may be separated from resource block set 535(3) by guard band 537. Resource block set 535(3) may be separated from resource block set 535(4) by guard band 536.

In some instances, when multiple contiguous resource block sets are reserved, the UE may transmit in the guard bands between the contiguous resource block sets. For example, when contiguous resource block sets 535(1) and 535(2) are reserved (e.g., corresponding bitmap of frequency resources set to 1) and cleared by LBT, the guard band 538 separating resource block set 535(1) from resource block set (2) may be used for PSSCH transmission after a successful LBT 644 in contiguous resource block sets 535 (1) and 535(2). However, the guard band 537 separating resource block set 535(2) from resource block set 535(3) may not be used for PSSCH transmission. PSSCH transmissions may be over multiple contiguous subchannels. For example, PSSCH transmissions may be over contiguous subchannels within reserved resource blocks of resource block sets 535(1) . . . 535(4).

In some aspects, resource block sets 535(1) . . . 535(4) may correspond to multiple sidelink subchannels 640 as shown by the reference numeral 600. The subchannel size may be any number of RBs. As shown, some sidelink subchannels 640 can be at least partially overlapping with the guard bands 538. In order to increase the efficient use of frequency resources, the size of the overlapping channels 640, 642 in the guard bands may be reduced. By reducing the size of the overlapping channels 640, 642, the number of unused frequency resources may be reduced. For example, since the guard bands are specified by the number of RBs in the subchannel, choosing a granularity for the size of the resource blocks may increase the efficient usage of available frequency resources. For example, reducing the subchannel size (e.g., reducing the subchannel size to 10 RBs) may reduce the amount of unused frequency resources in overlapping subchannels 640, 642 that overlap LBT guard bands. As another example, configuring the subchannel size to 15, 20, 25, 50, 75, or 100 RBs may increase the amount of unused frequency resources in overlapping subchannels 640, 642 that overlap LBT guard bands and contribute to unused resources (e.g. wasting resources).

Figure 7:
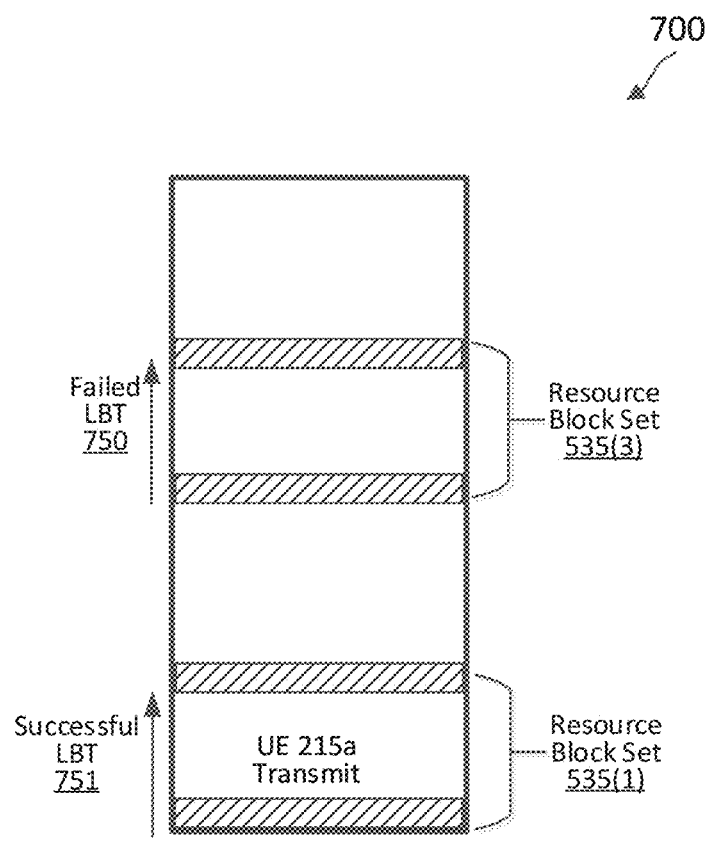
FIG. 7 illustrates reserved resources in clear LBT channels according to some aspects of the present disclosure.

FIG. 7 illustrates reserved resources 700 in clear LBT channels according to some aspects of the present disclosure. FIG. 7 shows frequency resources that have been previously reserved for a UE. For example, the UE 215a may have previously reserved resource block sets 535(1) and 535(3) in a previous SCI transmission. In order for the UE 215a to transmit in the reserved resource block sets 535(1) and 535(3), the UE 215a may perform an LBT to ensure that the channel is clear before transmitting. In the example of FIG. 7, the UE 215a may perform a successful LBT 751 before transmitting in reserved resource block set 535(1). The UE 215a may indicate a successful LBT 751 in a COT SI transmission. However, when the UE 215a performs an LBT to contend for the reserved resource block set 535(3), the failed LBT 750 restricts the UE 215a from transmitting in the reserved resource block set 535(3). The UE 215a may indicate a failed LBT 750 in a COT SI transmission. The failure to clear the LBT for transmitting in the reserved resource block set 535(3) may result in the reserved resource block set 535(3) becoming unreserved and available to other UEs. After the failed LBT 750, the UE 215a may transmit a COT SI (e.g., a COT SI carried in an SCI-1 or SCI-2) in which the bitmap for the reserved resources changes the status of the reserved resource block set 535(3) to unreserved (e.g., bitmap for the resource block set 535(3) set to 0).

In some instances, the UE 215a may be configured to secure a COT long enough to cover the reserved time domain resources (e.g., the number of slots indicated in the resource reservation). The UE 215a may perform a CAT4 LBT before attempting to transmit in the reserved resource block sets 535(1) and 535(3). When multiple resource blocks are reserved (e.g., reserved resource blocks 535(1) and 535(3)), the UE 215a may perform an LBT in each of the resource block sets. In some instances, the UE 215a may perform a CAT4 LBT on a randomly selected resource block sets among the reserved resource block sets and a CAT2 LBT on the remaining reserved resource block sets. For example, UE 215a may perform a CAT4 LBT on reserved resource block set 535(1) and a CAT2 LBT on reserved resource block set 535(3). The UE 215a may only transmit in the cleared LBT channels.

In some instances, the UEs within a reception area of the reserving UE (e.g., within an area surrounding the reserving UE that the other UEs are capable of decoding the COT SI) may receive the COT SI transmissions that indicate the future reserved resources of the reserving UE. The UEs receiving the resource reservations may respect the resource reservations by refraining from contending for the reserved resources and refraining from transmitting within the reserved resources. Further, the UEs receiving the resource reservations may respect the resources for a period of time before the reserved resources such that the reserving UE may perform a successful LBT 751 allowing the reserving UE to transmit within the reserved resources. In some instances, the UEs receiving the resource reservations may respect the reserved resources (e.g., by refraining from transmitting in the reserved resources) such that the reserving UE does not need to perform an LBT at the beginning of the reserved resources.

In some instances, the reserving UE may be configured to reserve future resources in a controlled manner such that an excessive amount of resources are not reserved. For example, the reserving UE may reserve future resources for retransmission of initial transmissions that have failed. The reserving UE may be configured to determine the probability of transmission failures (e.g., based on ACK/NACK history, channel quality indicators, etc.) and reserve future resources based on the probability of transmission failures.

In some instances, the reserving UE may initiate its own COT before reserving the future resources. In some instances, the reserving UE may share a COT with other UE(s). For example, another UE may initiate a COT before (e.g. 2 symbols before) the reserved resources and may share the COT with the reserving UE after the other UE finishes its transmission. The other UE initiating the COT before the reserved resources may configure the COT to cover the reserved resources and share the COT with the reserving UE. The COT sharing could be in a FDM region or a TDM region after the other UE (e.g., the COT initiating UE) finishes its own transmission.

The reserving UE, after detecting the COT sharing signaled in COT-SI, may perform a CAT1 LBT (e.g. no LBT) and/or a CAT2 LBT before transmitting in the reserved resources. If the COT-SI indicating the shared COT is not detected by the reserving UE, the reserving UE may perform a CAT 4 LBT before transmitting in the reserved resources.

Figure 8:
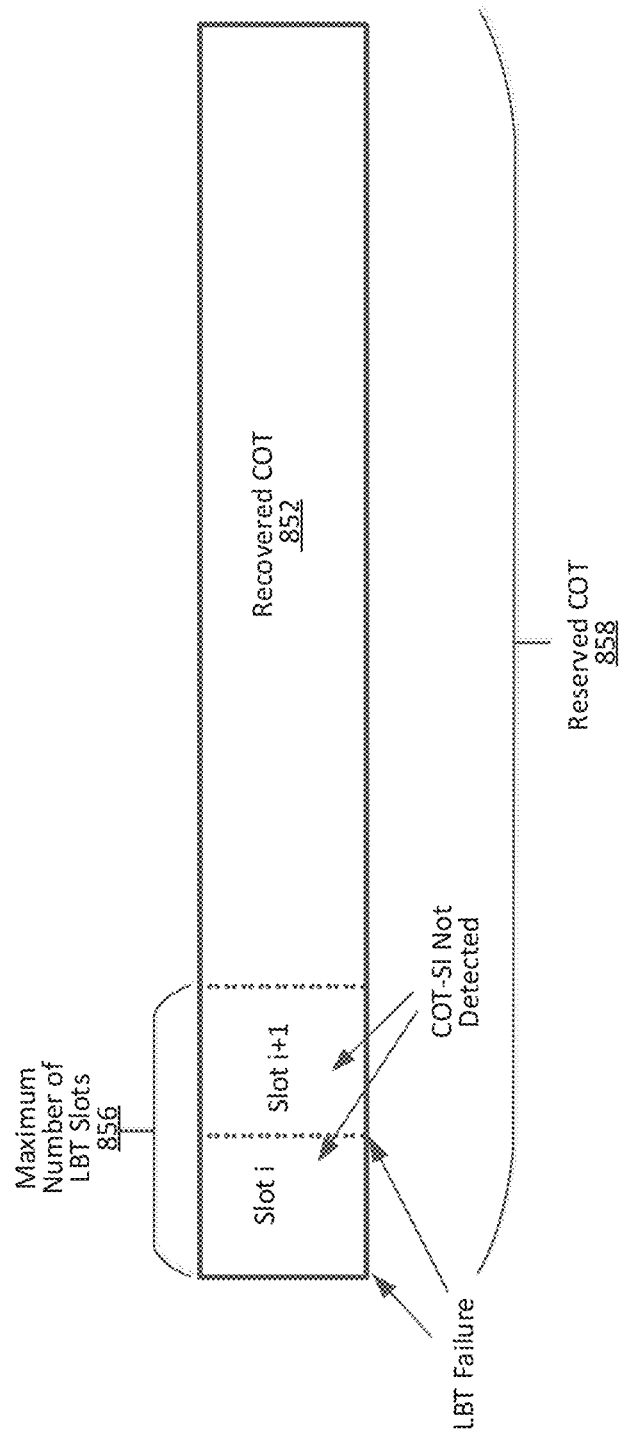
FIG. 8 illustrates recovered resources for sidelink communications according to some aspects of the present disclosure.

FIG. 8 illustrates recovered resources for sidelink communications according to some aspects of the present disclosure. The mechanisms described above for reserving future resources may benefit the reserving UE by increasing the probability of successful transmissions and retransmissions. The reserving UE may reserve a number of future resources (e.g., 1, 2, 3, or more resource blocks). However, the reserving UE may not use all of the reserved resources or the UE may be unable to access the COT during the reserved resources. Therefore, a mechanism to recover the reserved resources that are not needed by the reserving UE may increase the efficiency of the wireless communication network. The recovered resources not needed by the reserving UE may be used by the other UEs. For example, the other UEs may monitor for COT SI from the reserving UE (the COT SI may carry the reserving UE ID). The other UEs may compare the reserved COT to the COT SI to determine whether the reserving UE is transmitting in the reserved resources. If the other UEs detect that the reserved COT is not used by the reserving UE, the other UEs may contend for the COT (perform a LBT) and transmit in the COT if the LBT is successful. For example, referring to FIG. 8, the reserving UE may have reserved COT 858 as a future resource for retransmission. The other UEs may listen for the COT SI from the reserving UE during a maximum number of LBT slots 856 at the beginning of the reserved COT 858. If the LBT fails or a COT SI is not detected during slot i, slot i+1, up to the maximum number of LBT slots 856, then the resources in recovered COT 852 may be used by the other UEs. The other UEs may contend for the resources through the LBT procedures. In some instances, the RRC may configure the maximum number of LBT slots 856 of a reserved COT 858 that may be used by the reserving UE for LBT attempts.

As described above, the reserved resources blocks may be located within reserved COT 858 and transmission within the reserved resources may be dependent on the priority level of the traffic to be transmitted (a transmission by the reserving UE may be blocked by higher priority traffic from other UEs). In order to create a fair balance of reserved resources and traffic prioritization, the time domain duration of the reserved resources and the number of reserved resources in the time domain may be based on the traffic priority. For example, lower priority traffic may reserve more resources (more COTs) or longer COTs since the lower priority traffic may get overridden by the higher priority traffic. Additionally or alternatively, the higher priority traffic may reserve shorter COTs (smaller resource blocks in the time domain) or less COTs since the chance of being overridden is lower. This balancing of traffic priority and amount of reserved resources may enable a fair balance of access to the channel by all UEs.

Figure 9:
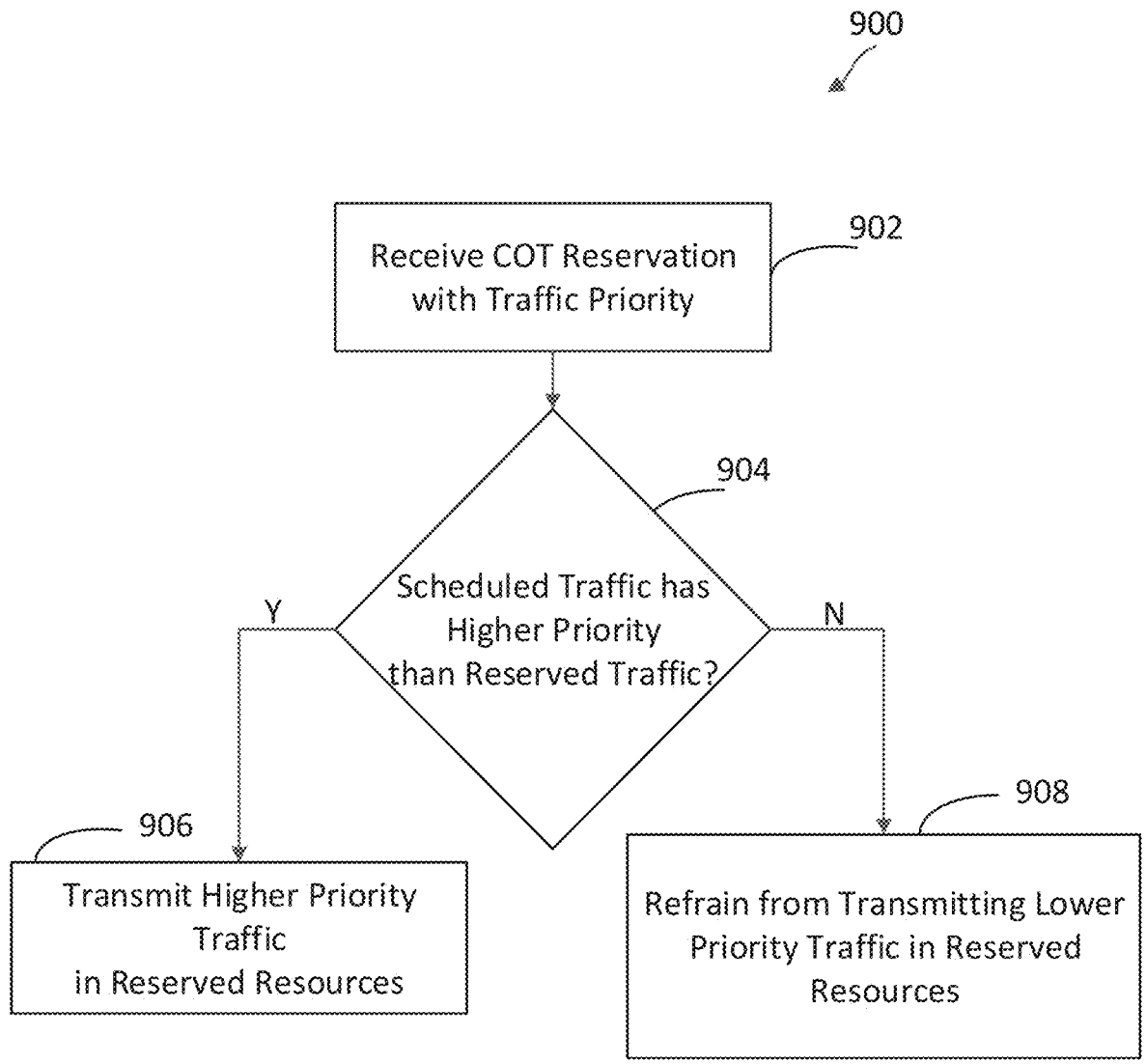
FIG. 9 is a flow diagram of a method for prioritizing traffic in reserved frequency resources according to some aspects of the present disclosure.

FIG. 9 is a flow diagram illustrating a method 900 for prioritizing traffic in reserved resources according to some aspects of the present disclosure. The method 900 may be implemented by a UE 215. The method 900 may be performed with respect to sidelink communications in a wireless communications network (e.g., wireless communication network 100 or 200). As illustrated, the method 900 includes a number of enumerated actions, but aspects of the method 900 may include additional actions before, after, and in between the enumerated actions. In some aspects, one or more of the enumerated actions may be omitted or performed in a different order.

At block 902, the UE (e.g., UE 115, UE 215) may receive a COT resource reservation that indicates a traffic prioritization. For instance, the UE may receive a COT SI within an SCI (SCI-1 and/or SCI-2) from a UE that is reserving future resources. As described herein, the UE receiving the COT reservation that indicates a traffic prioritization may decode the COT SI to extract the traffic prioritization. The traffic prioritization may be based on a channel access priority class (CAPC) associated with the traffic.

In some instances, the data traffic (e.g., PSSCH traffic) transmitted by the reserving UE may have an associated priority. For example, embodiments of the present disclosure may be used within a V2X wireless communication network (e.g., wireless communication network 100, 200). The data packets (e.g., transport blocks) transmitted by the UEs within the wireless network may have a priority determined by requirements including latency and/or reliability. For example, data packets associated with vehicle collision avoidance may have a higher priority (e.g., requiring low latency and high reliability) than data packets associated with a cooperative vehicle lane change. In order to prioritize the transmission of data packets, the COT SI resource reservation may carry information elements indicating the traffic priority. For example, the traffic priority may be indicated as a (CAPC) of the PSSCH within the COT SI. When a reserving UE transmits the COT SI carrying the CAPC, the other UEs in the area that decode the COT SI may be aware of the priority of the traffic to be transmitted in the reserved resources.

In some instances, a mechanism may be implemented to prioritize the data traffic transmitted by the reserving UE and the other UEs that have decoded the COT SI that includes the CAPC. For example, only the UEs with lower or equal traffic priority may refrain from transmitting in the reserved resources. If the other UE has higher priority traffic than the reserving UE, the other UE may perform an LBT before (e.g. 2 symbols before) the reserved resources and extend the COT to overlap with the reserved resources when necessary to transmit the higher priority traffic. In this case, the reserving UE with lower priority traffic may be blocked from transmitting in the reserved resources. In some instances, the other UE with higher priority traffic may contend for the reserved resources with the reserving UE right before or at the reserved resource with an LBT.

In some instances, the reserving UE may have the same traffic priority as the other UE (e.g., same CAPC). In order to introduce fair access to the channel, some contention rules may be implemented. For example, to avoid the condition in which the reserving UE restricts channel access to the other UEs through excessive resource reservation, the other UE with traffic priority equal to the reserved resources may determine whether to respect the reserved resources based on how many times the other UE backs off from accessing the channel and/or the number of times the reserving UE transmits on the reserved resources. In order to make efficient use of the network resources, the other UEs may monitor the COT SI to determine whether the reserving UE is properly reserving resources. For example, the probability that the other UE may not respect the reserved resources may increase if the percentage of backing off from accessing the channel over the number of reserved resources from the reserving UE is greater than a preconfigured threshold. As another example, the other UEs may monitor the number of times the reserving UE is transmitting in the reserved resources and the number of reserved resources. If the ratio of the number of times the reserving UE is not transmitting in the reserved resources over the number of reserved resources is over a threshold, then the other UEs may not respect the resources reserved by the reserving UE as the reserving UE is not efficiently utilizing the reserved resources. Additionally or alternatively, if the ratio of the number of times the reserving UE is transmitting in the reserved resources over the number of reserved resources is less than a threshold, then the other UEs may not respect the resources reserved by the reserving UE as the reserving UE is not efficiently utilizing the reserved resources.

At block 904, the UE receiving the COT resource reservation may determine whether the UE has traffic to transmit during the reserved resources. If the UE has traffic the transmit during the reserved resources, the UE may compare its traffic priority to the traffic priority of the traffic associated with the reserved resources. If the UE has traffic to be transmitted with a higher priority than the traffic associated with the reserved resources, the UE proceeds to block 906 to perform an LBT before the reserved resources and transmit the higher priority traffic during a time period at least partially overlapping with the reserved resources if the LBT is successful. If the UE has traffic to be transmitted with a lower priority than the traffic associated with the reserved resources, the UE proceeds to block 908 and refrains from transmitting the lower priority traffic within the reserved resources.

Figure 10:
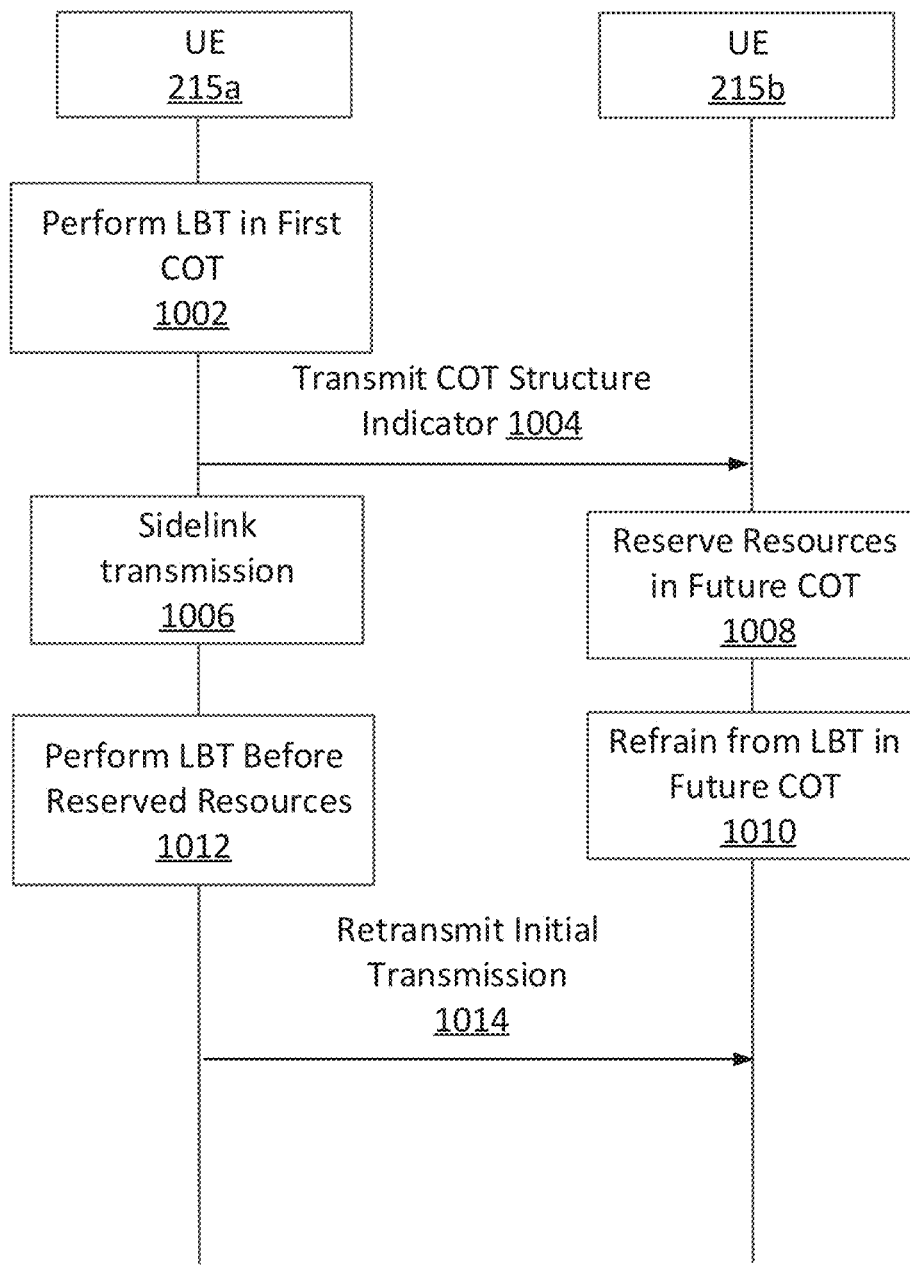
FIG. 10 is a flow diagram of a method for reserving future resources for sidelink communications according to some aspects of the present disclosure.

FIG. 10 illustrates a signaling diagram of a method 1000 for reserving resources in a sidelink communication according to some aspects of the present disclosure. The method 1000 may be implemented between a UE 215a and a UE 215b. The UE 215a and UE 215b may be similar to the UEs 115 of FIG. 1 or the UEs 215 of FIG. 2. The method 1000 illustrates the UE 215a reserving resources for future transmission or retransmissions. The method 1000 may utilize similar mechanisms as discussed above with reference to FIGS. 3-9 to reserve resources in a sidelink communication.

At 1002, the UE 215a may perform a LBT (e.g., CAT4 LBT) in a first COT. If the LBT is successful and the channel is cleared, the UE 215a may obtain s COT in the shared channel for communications of the UE 215a and a shared COT that may be used by other UEs.

At 1004, the UE 215a may transmit an LBT complete indication and a COT SI that indicates reserved resources in future COTs.

At 1006, the UE 215a may transmit a sidelink communication that includes an initial transmission. In some instances, the initial transmission may require a retransmission in the future reserved resources based on the success or failure of the initial transmission.

At 1008, the UE 215b (and other UEs in a receive range of the UE 215a) may receive the COT SI indicating the reserved resources. The UE 215b may process the COT SI, and thus may be aware of the resources reserved by the UE 215a and refrain from contending for the reserved resources subject to traffic priority.

At 1010, the 215b (and other UEs in a receive range of the UE 215a) may refrain from contending for the reserved resources and may refrain from transmitting in the reserved resources.

At 1012, the UE 215a may perform an LBT (e.g., a CAT4 LBT) during a time period before the reserved resource.

At 1014, the UE 215a may retransmit the initial transmission in the reserved resources.

Figure 11:
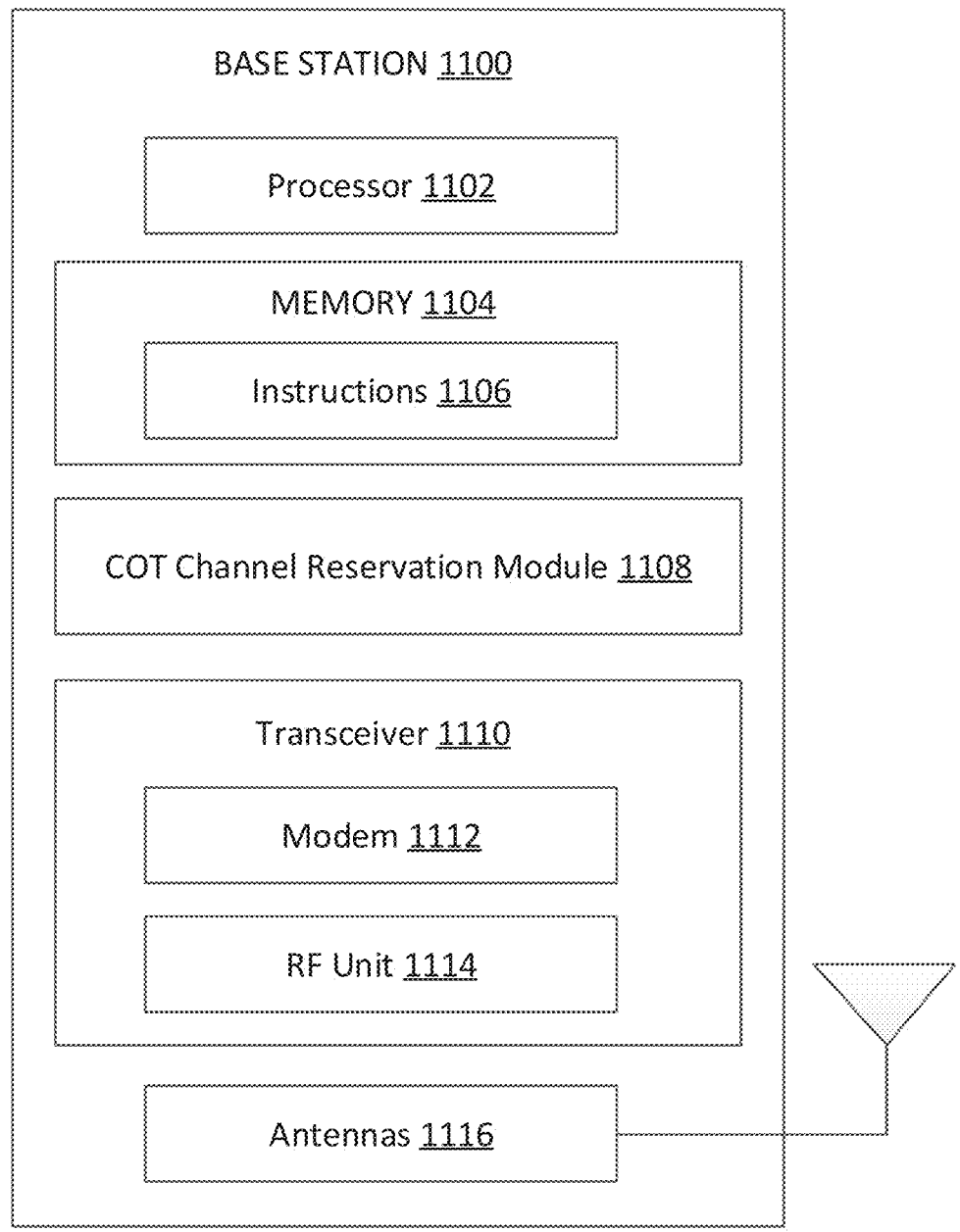
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1. A shown, the BS 1100 may include a processor 1102, a memory 1104, a COT channel reservation module 1108, a transceiver 1110 including a modem subsystem 1112 and a RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1-2. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT channel reservation module 1108 may be implemented via hardware, software, or combinations thereof. For example, the COT channel reservation module 1108 may be implemented as a processor, circuit, and/or instructions 1106 stored in the memory 1104 and executed by the processor 1102. In some examples, the COT channel reservation module 1108 can be integrated within the modem subsystem 1112. For example, the COT channel reservation module 1108 can be implemented by a combination of software components (e.g., executed by a DSP or a general processor) and hardware components (e.g., logic gates and circuitry) within the modem subsystem 1112.

The COT channel reservation module 1108 may communicate with one or more components of the BS 1100 to perform for various aspects of the present disclosure, for example, aspects of FIGS. 1-2. The COT channel reservation module 1108 is configured to configure a UE (e.g., the UEs 115, 215) with future reserved resources for sidelink communications while the UE is in a coverage of the BS 1100.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configuration, sidelink resource pool configurations, frequency-only resource reservation configuration) from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 according to some aspects of the present disclosure. The antennas 1116 may further receive data messages transmitted from other devices and provide the received data messages for processing and/or demodulation at the transceiver 1110. The transceiver 1110 may provide the demodulated and decoded data to the COT channel reservation module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
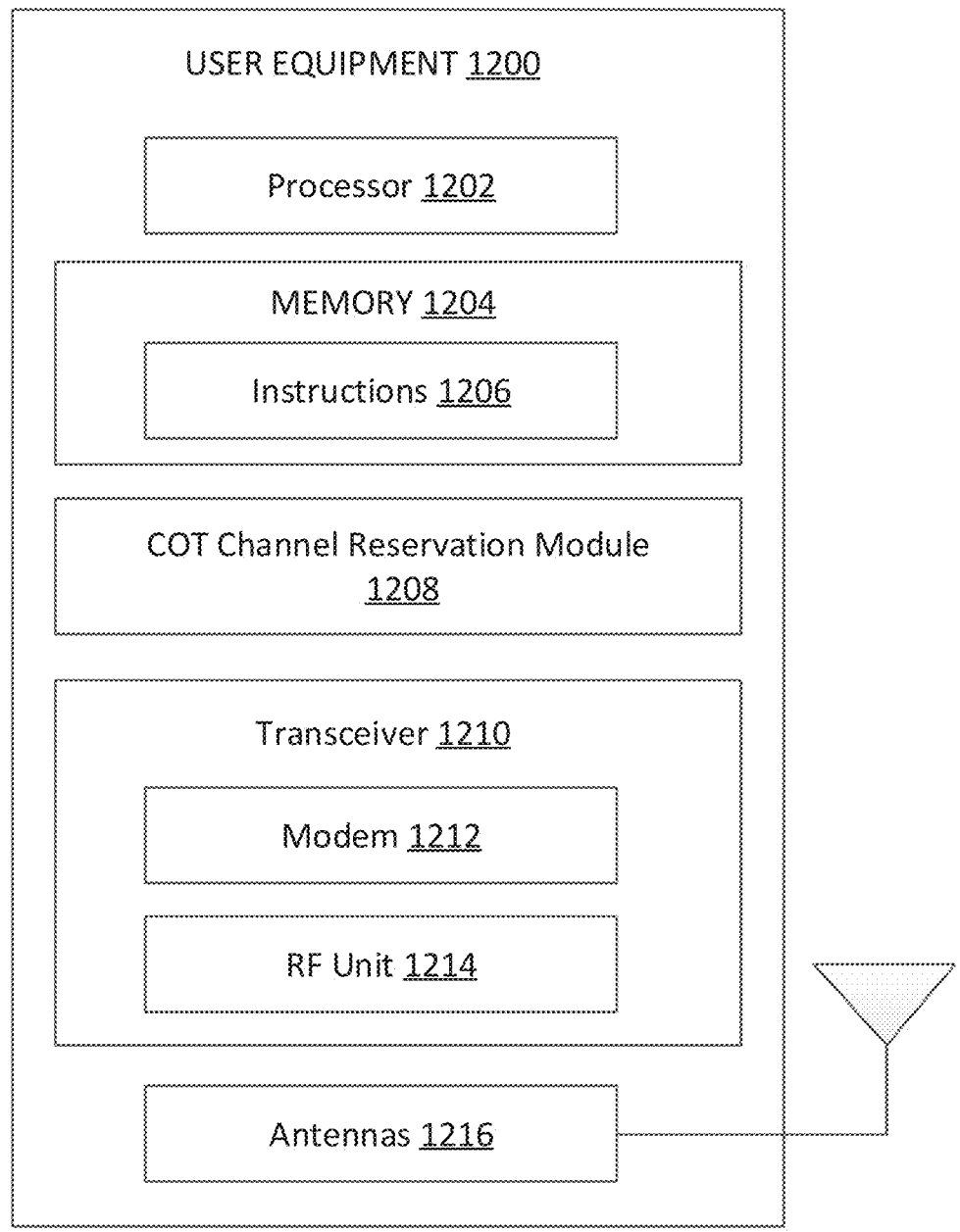
FIG. 12 is a block diagram of an exemplary user equipment (UE) according to some aspects of the present disclosure.

FIG. 12 is a block diagram of an exemplary UE 1200 according to some aspects of the present disclosure. The UE 1200 may be a UE 115 as discussed above with respect to FIG. 1 or a UE 215 as discussed above with respect to FIGS. 3-10 and 13. As shown, the UE 1200 may include a processor 1202, a memory 1204, a COT channel reservation module 1208, a transceiver 1210 including a modem subsystem 1212 and a radio frequency (RF) unit 1214, and one or more antennas 1216. These elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 and/or 215 in connection with aspects of the present disclosure, for example, aspects of FIGS. 3-10 and 13. Instructions 1206 may also be referred to as program code, which may be interpreted broadly to include any type of computer-readable statement(s) as discussed above with respect to FIG. 12.

The COT channel reservation module 1208 may be implemented via hardware, software, or combinations thereof. For example, the COT channel reservation module 1208 may be implemented as a processor, circuit, and/or instructions 1206 stored in the memory 1204 and executed by the processor 1202. In some examples, the COT channel reservation module 1208 can be integrated within the modem subsystem 1212. For example, the COT channel reservation module 1208 can be implemented by a combination of software components (e.g., executed by a DSP or a general processor) and hardware components (e.g., logic gates and circuitry) within the modem subsystem 1212.

The COT channel reservation module 1208 may communicate with one or more components of the UE 1200 to perform for various aspects of the present disclosure, for example, aspects of FIGS. 3-10 and 13. In some aspects, the COT channel reservation module 1208 is configured to reserve future time and frequency resources for communication retransmissions, for example, as discussed above in relation to FIGS. 3-10 and 13.

The COT channel reservation module 1208 is further configured to perform, in a shared radio frequency band, a listen-before-talk (LBT) for a first channel occupancy time (COT) and transmit, during the first COT, a COT structure indicator. The COT structure indicator may reserve at least one resource within a second COT different than the first COT.

The COT channel reservation module 1208 is further configured to transmit, during the first COT based on the COT structure indicator, a further COT structure indicator.

The COT channel reservation module 1208 is further configured to transmit, based on a successful LBT in a first frequency subband and a successful LBT in a second frequency subband, a communication signal in at least a guard band between the first and second frequency subbands.

The COT channel reservation module 1208 is further configured to transmit a communication signal in a first frequency subband and refrain from transmitting in a guard band between the first frequency subband and a second frequency subband based on an unsuccessful LBT in the second frequency subband.

The COT channel reservation module 1208 is further configured to receive, within a first channel occupancy time (COT) in a shared radio frequency band, a COT structure indicator, wherein the COT structure indicator reserves at least one resource within a second COT different than the first COT and refrain, based on the COT structure indicator reserving the at least one resource within the second COT, from contending for the second COT.

The COT channel reservation module 1208 is further configured to transmit, in the second COT based on at least one of traffic priority indicated by the COT structure indicator or a traffic priority associated with the UE, a communication signal.

As shown, the transceiver 1210 may include the modem subsystem 1212 and the RF unit 1214. The transceiver 1210 can be configured to communicate bi-directionally with other devices, such as the BSs 105. The modem subsystem 1212 may be configured to modulate and/or encode the data from the memory 1204 and/or the COT channel reservation module 1208 according to a modulation and coding scheme (MCS), e.g., a COT SI, a CAPC, an SCI-1, an SCI-2, a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., PSCCH SCI, PSSCH data, frequency-only reservations, time-frequency legacy reservations, soft frequency-only reservations) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may include one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., COT SI, CAPC, SCI-1, SCI-2, RRC configuration, sidelink resource pools configurations, PSCCH SCI, PSSCH data, frequency-only reservations, time-frequency legacy reservations) to the COT channel reservation module 1208 for processing. The antennas 1216 may include multiple antennas of similar or different designs in order to sustain multiple transmission links. The RF unit 1214 may configure the antennas 1216.

In some aspects, the processor 1202 is configured to communicate with one or more components of the UE 1200 to perform, in a shared radio frequency band, a listen-before-talk (LBT) for a first channel occupancy time (COT). The transceiver 1210 is configured to communicate with one or more components of the UE 1200 to transmit, to a second UE (e.g., the UEs 115 and/or 215) during the first COT, a COT structure indicator, wherein the COT structure indicator reserves at least one resource within a second COT different than the first COT.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
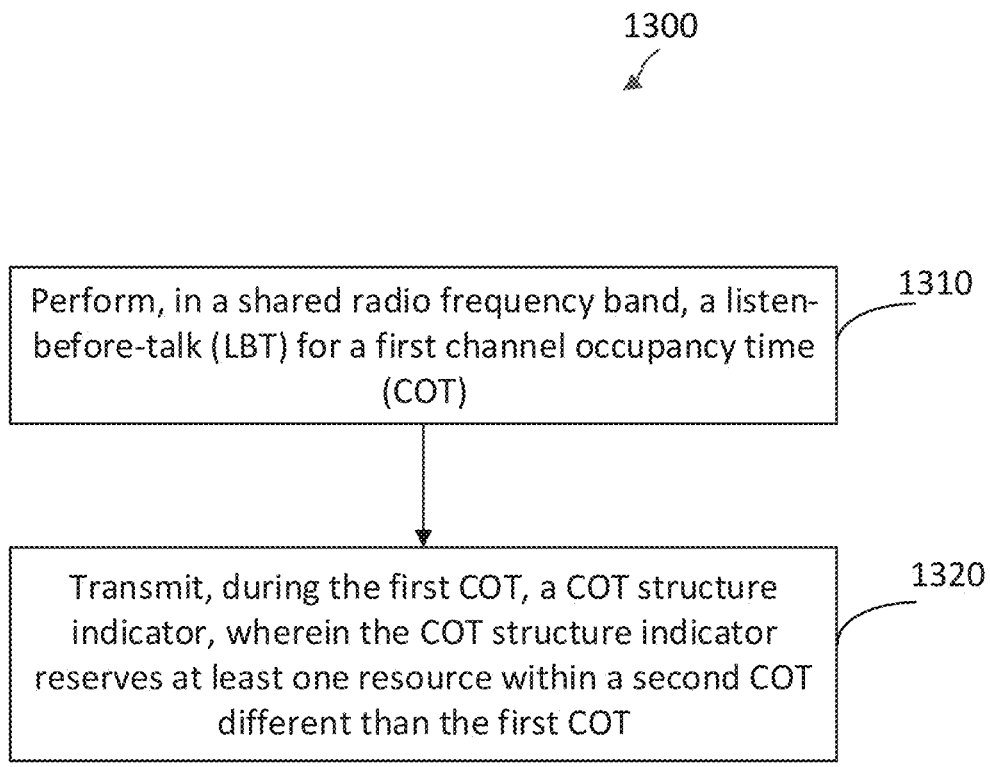
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as a UE 115, 215, 1200 may utilize one or more components, such as the processor 1202, the memory 1204, the COT channel reservation module 1208, the transceiver 1210, the modem 1212, and the one or more antennas 1216, to execute the steps of method 1300. The method 1300 may employ similar mechanisms as described above in FIGS. 3-10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a UE may perform, in a shared radio frequency band, a listen-before-talk (LBT) for a first channel occupancy time (COT). In some aspects, the UE may perform a CAT 4 LBT (e.g., performed by a PHY layer at the UE). The LBT may include sensing and/or measuring signal energy in the channel. If the LBT is successful, the UE may have access to the channel (e.g., the UE may transmit in the channel). In some aspects, the UE may utilize one or more components, such as the processor 1202, the memory 1204, the COT channel reservation module 1208, the transceiver 1210, the modem 1212, and the one or more antennas 1216, to perform the operations at block 1310.

At block 1320, the UE may transmit, during the first COT, a COT structure indicator (COT SI), wherein the COT structure indicator reserves at least one resource within a second COT different than the first COT. In some aspects, the UE may transmit the COT SI in the channel after determining the channel is clear as described with reference to block 1310. The COT SI may be part of sidelink control information (e.g., SCI-1, SCI-2) that is transmitted to the other UEs. The COT SI transmitted by the UE may be received by other UEs within a receive range of the UE. In some instances, the COT SI may be transmitted multiple times within the first COT. The COT SI may include a reservation for future resources including multiple slots or multiple subchannels within the second COT as described with reference to FIGS. 3-4. The COT SI may also include a starting time or a duration of the reserved resources within the second COT as described with reference to FIG. 3. The reserving UE may also transmit within frequency guard bands as described with reference to FIGS. 5-6. In some aspects, the other UEs receiving the COT SI indicating the reserved resources may respect the reservations by refraining from transmitting just before and during the reserved resources within the second COT. However, if the reserved resources are unused by the reserving UE, the other UEs may use the reserved resources as described with reference to FIG. 8. In some aspects, the COT SI may include a traffic priority associated with the traffic to be transmitted. The other UEs may transmit within the reserved resources when the other UEs have higher priority traffic to be transmitted as described with reference to FIG. 9. In some aspects, the UE may utilize one or more components, such as the processor 1202, the memory 1204, the COT channel reservation module 1208, the transceiver 1210, the modem 1212, and the one or more antennas 1216, to perform the operations at block 1320.

By way of non-limiting examples, the following aspects are included in the present disclosure.

Aspect 1 includes a method of wireless communication performed by a user equipment (UE), the method comprising performing, in a shared radio frequency band, a listen-before-talk (LBT) for a first channel occupancy time (COT) and transmitting, during the first COT, a COT structure indicator, wherein the COT structure indicator reserves at least one resource within a second COT different than the first COT.

Aspect 2 includes the method of aspect 1, wherein the at least one resource comprises at least one of multiple slots or multiple subchannels within the second COT.

Aspect 3 includes the method of any of aspects 1-2, further comprising transmitting, during the first COT based on the COT structure indicator, a further COT structure indicator.

Aspect 4 includes the method of any of aspects 1-3, wherein the COT structure indicator indicates at least one of a starting time or a duration of the at least one reserved resource within the second COT.

Aspect 5 includes the method of any of aspects 1-4, wherein the COT structure indicator indicates the starting time of the at least one reserved resource within the second COT with respect to a transmission time of the COT structure indicator.

Aspect 6 includes the method of any of aspects 1-5, wherein the COT structure indicator indicates the starting time of the at least one reserved resource within the second COT with respect to an end of the first COT.

Aspect 7 includes the method of any of aspects 1-6, wherein the COT structure indicator indicates at least one of a starting frequency subchannel or a number of frequency subchannels of the at least one reserved resource within the second COT.

Aspect 8 includes the method of any of aspects 1-7, wherein the COT structure indicator indicates at least one set of resource blocks from among multiple sets of resource blocks for the at least one reserved resource within the second COT.

Aspect 9 includes the method of any of aspects 1-8, wherein the COT structure indicator indicates at least one of a starting LBT frequency subband or a number of LBT frequency subbands within the second COT for the at least one reserved resource.

Aspect 10 includes the method of any of aspects 1-9, further comprising transmitting, based on a successful LBT in a first frequency subband and a successful LBT in a second frequency subband, a communication signal in at least a guard band between the first and second frequency subbands.

Aspect 11 includes the method of any of aspects 1-10, further comprising transmitting a communication signal in a first frequency subband and refraining from transmitting in a guard band between the first frequency subband and a second frequency subband based on an unsuccessful LBT in the second frequency subband.

Aspect 12 includes the method of any of aspects 1-11, further comprising performing, in the shared radio frequency band, an LBT for the at least one reserved resource in the second COT.

Aspect 13 includes the method of any of aspects 1-12, wherein the COT structure indicator indicates a traffic priority associated with the at least one reserved resource.

Aspect 14 includes the method of any of aspects 1-13, wherein a number of the at least one reserved resource is based on a traffic priority associated with the at least one reserved resource.

Aspect 15 includes a method of wireless communication performed by a user equipment (UE), the method comprising receiving, within a first channel occupancy time (COT) in a shared radio frequency band, a COT structure indicator, wherein the COT structure indicator reserves at least one resource within a second COT different than the first COT and refraining, based on the COT structure indicator reserving the at least one resource within the second COT, from contending for the second COT.

Aspect 16 includes the method of aspect 15, further comprising refraining from transmitting in the at least one reserved resource within the second COT.

Aspect 17 includes the method of any of aspects 15-16, further comprising refraining from transmitting in a resource adjacent to the at least one reserved resource within the second COT.

Aspect 18 includes the method of any of aspects 15-17, further comprising performing an LBT for a third COT and adjusting a duration of the third COT based on the at least one reserved resource within the second COT.

Aspect 19 includes the method of any of aspects 15-18, wherein the COT structure indicator indicates a traffic priority associated with the at least one reserved resource within the second COT.

Aspect 20 includes the method of any of aspects 15-19, further comprising transmitting, in the second COT based on at least one of traffic priority indicated by the COT structure indicator or a traffic priority associated with the UE, a communication signal.

Aspect 21 includes the method of any of aspects 15-20, wherein the traffic priority indicated by the COT structure indicator has a same traffic priority associated with the UE and the method further comprises transmitting, in the second COT based on at least one of a number of unsuccessful LBTs, a number of reserved resources associated with a second UE, or a number of unoccupied resources associated with the second UE, a communication signal.

Aspect 22 includes the method of any of aspects 15-21, further comprising monitoring for a COT structure indicator associated with the second COT and transmitting, in the second COT based on a failure to detect the COT structure indicator associated with the second COT, a communication signal.

Aspect 23 includes the method of any of aspects 15-22, wherein the transmitting the communication signal comprises transmitting, in the second COT further based on a failure to detect the COT structure indicator associated with the second COT after a number of slots from a starting time of the second COT, the communication signal.

Aspect 24 includes a user equipment (UE), comprising a processor configured to perform any one of aspects 1-14.

Aspect 25 includes a user equipment (UE), comprising a processor configured to perform any one of aspects 15-23.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    performing, in a shared radio frequency band, a listen-before-talk (LBT) for a first channel occupancy time (COT); and
    transmitting, during the first COT, a COT structure indicator, wherein the COT structure indicator reserves at least one resource within a second COT different than the first COT.

2. The method of claim 1, wherein the at least one resource comprises at least one of multiple slots or multiple subchannels within the second COT.

3. The method of claim 1, further comprising:
    transmitting, during the first COT based on the COT structure indicator, a further COT structure indicator.

4. The method of claim 1, wherein:
    the COT structure indicator indicates at least one of a starting time or a duration of the at least one reserved resource within the second COT.

5. The method of claim 4, wherein:
    the COT structure indicator indicates the starting time of the at least one reserved resource within the second COT with respect to a transmission time of the COT structure indicator.

6. The method of claim 4, wherein:
    the COT structure indicator indicates the starting time of the at least one reserved resource within the second COT with respect to an end of the first COT.

7. The method of claim 1, wherein:
    the COT structure indicator indicates at least one of a starting frequency subchannel or a number of frequency subchannels of the at least one reserved resource within the second COT.

8. The method of claim 1, wherein:
    the COT structure indicator indicates at least one set of resource blocks from among multiple sets of resource blocks for the at least one reserved resource within the second COT.

9. The method of claim 1, wherein:
    the COT structure indicator indicates at least one of a starting LBT frequency subband or a number of LBT frequency subbands within the second COT for the at least one reserved resource.

10. The method of claim 1, further comprising:
    transmitting, based on a successful LBT in a first frequency subband and a successful LBT in a second frequency subband, a communication signal in at least a guard band between the first and second frequency subbands.

11. The method of claim 1, further comprising:
    transmitting a communication signal in a first frequency subband; and
    refraining from transmitting in a guard band between the first frequency subband and a second frequency subband based on an unsuccessful LBT in the second frequency subband.

12. The method of claim 1, further comprising:
    performing, in the shared radio frequency band, an LBT for the at least one reserved resource in the second COT.

13. The method of claim 1, wherein the COT structure indicator indicates a traffic priority associated with the at least one reserved resource.

14. The method of claim 1, wherein a number of the at least one reserved resource is based on a traffic priority associated with the at least one reserved resource.

15. A method of wireless communication performed by a user equipment (UE), the method comprising:
    receiving, within a first channel occupancy time (COT) in a shared radio frequency band, a COT structure indicator, wherein the COT structure indicator reserves at least one resource within a second COT different than the first COT; and
    refraining, based on the COT structure indicator reserving the at least one resource within the second COT, from contending for the second COT.

16. The method of claim 15, further comprising:
    refraining from transmitting in the at least one reserved resource within the second COT.

17. The method of claim 15, further comprising:
    refraining from transmitting in a resource adjacent to the at least one reserved resource within the second COT.

18. The method of claim 15, further comprising:
performing an LBT for a third COT; and
adjusting a duration of the third COT based on the at least one reserved resource within the second COT.

19. The method of claim 15, wherein the COT structure indicator indicates a traffic priority associated with the at least one reserved resource within the second COT.

20. The method of claim 19, further comprising:
transmitting, in the second COT based on at least one of traffic priority indicated by the COT structure indicator or a traffic priority associated with the UE, a communication signal.

21. The method of claim 19, wherein the traffic priority indicated by the COT structure indicator has a same traffic priority associated with the UE; and
the method further comprises:
transmitting, in the second COT based on at least one of a number of unsuccessful LBTs, a number of reserved resources associated with a second UE, or a number of unoccupied resources associated with the second UE, a communication signal.

22. The method of claim 15, further comprising:
monitoring for a COT structure indicator associated with the second COT; and
transmitting, in the second COT based on a failure to detect the COT structure indicator associated with the second COT, a communication signal.

23. The method of claim 22, wherein the transmitting the communication signal comprises:
transmitting, in the second COT further based on a failure to detect the COT structure indicator associated with the second COT after a number of slots from a starting time of the second COT, the communication signal.

24. A user equipment (UE), comprising:
a memory;
a transceiver; and
at least one processor coupled to the memory and the transceiver, wherein the UE is configured to:
perform, in a shared radio frequency band, a listen-before-talk (LBT) for a first channel occupancy time (COT); and
transmit, during the first COT, a COT structure indicator, wherein the COT structure indicator reserves at least one resource within a second COT different than the first COT.

25. The UE of claim 24, wherein the COT structure indicator indicates:
at least one of a starting time or a duration of the at least one reserved resource within the second COT;
the starting time of the at least one reserved resource within the second COT with respect to a transmission time of the COT structure indicator;
the starting time of the at least one reserved resource within the second COT with respect to an end of the first COT;
at least one of a starting frequency subchannel or a number of frequency subchannels of the at least one reserved resource within the second COT;
at least one set of resource blocks from among multiple sets of resource blocks for the at least one reserved resource within the second COT; and
at least one of a starting LBT frequency subband or a number of LBT frequency subbands within the second COT for the at least one reserved resource.

26. The UE of claim 24, wherein the UE is further configured to:
transmit, based on a successful LBT in a first frequency subband and a successful LBT in a second frequency subband, a communication signal in at least a guard band between the first and second frequency subbands.

27. The UE of claim 24, wherein:
the COT structure indicator indicates a traffic priority associated with the at least one reserved resource; and
a number of the at least one reserved resource is based on a traffic priority associated with the at least one reserved resource.

28. A user equipment (UE), comprising:
a memory;
a transceiver; and
at least one processor coupled to the memory and the transceiver, wherein the UE is a configured to:
receive, within a first channel occupancy time (COT) in a shared radio frequency band, a COT structure indicator, wherein the COT structure indicator reserves at least one resource within a second COT different than the first COT; and
refrain, based on the COT structure indicator reserving the at least one resource within the second COT, from contending for the second COT.

29. The UE of claim 28, wherein the UE is further configured to at least one of:
refrain from transmitting in the at least one reserved resource within the second COT; or
refrain from transmitting in a resource adjacent to the at least one reserved resource within the second COT.

30. The UE of claim 28, wherein the UE is further configured to:
perform an LBT for a third COT; and
adjust a duration of the third COT based on the at least one reserved resource within the second COT.

* * * * *